United States Patent [19]

Putney

[11] 3,885,933
[45] May 27, 1975

[54] CLASSIFYING CENTRIFUGAL SEPARATOR

[75] Inventor: David H. Putney, Shawnee Mission, Kans.

[73] Assignee: Stratford Engineering Corporation, Kansas City, Mo.

[22] Filed: Sept. 20, 1974

[21] Appl. No.: 507,667

[52] U.S. Cl. .................. 55/397; 55/452; 55/459; 209/144
[51] Int. Cl. ............................................ B01d 45/12
[58] Field of Search ...... 209/144, 211; 55/394, 396, 55/397, 398, 452, 459

[56] References Cited
UNITED STATES PATENTS

| | | | |
|---|---|---|---|
| 1,897,195 | 2/1933 | Howden | 55/459 X |
| 1,914,282 | 6/1933 | O'Toole, Sr. | 55/452 X |
| 2,331,786 | 10/1943 | Lincoln | 55/397 |
| 2,472,777 | 6/1949 | Putney | 55/397 |
| 2,751,043 | 6/1956 | Ruth et al. | 55/397 |

*Primary Examiner*—Frank W. Lutter
*Assistant Examiner*—David L. Lacey
*Attorney, Agent, or Firm*—Thomas M. Scofield, Esq.

[57] ABSTRACT

Improvements in apparatus for separating finely divided particles or dust from gases; a classifying centrifugal separator which collects particles of greater size and weight in a separate zone thereof from particles of lesser size and weight for separate handling; a quadruple tube classifying centrifugal separator employing centrifugal force powered bleedback to aid classification and separation.

4 Claims, 8 Drawing Figures

PATENTED MAY 27 1975　　3,885,933

SHEET 2

—— RUN 1-INNER PRODUCT
---- RUN 1-OUTER PRODUCT

—— RUN 2-INNER PRODUCT
---- RUN 2-OUTER PRODUCT

CLASSIFYING CENTRIFUGAL SEPARATOR

BACKGROUND OF THE INVENTION

In the art of separating dust, ash or finely divided solids from air, gas or vapor, the principle of centrifugal separation is well known. Cyclone type separators utilizing this principle are widely used. However, the separating efficiency of such centrifugal separators is frequently so low that it is necessary to supplement them with secondary separators such as magnetic separators, filters, scrubbers or electrical precipitators.

An example of this is found in the current practice followed in catalytic conversion processes, such as fluid catalytic cracking of hydrocarbons, where cyclone type separators are employed for removing the finely divided catalyst dust from the vapors leaving the reactors and from the flue gas leaving the generator. The separating efficiency of such separators usually runs between 85 percent and 95 percent and the loss of catalyst in the effluent from the separators would be many tons per day if secondary separating means were not employed.

It is conventional practice to scrub the hydrocarbon vapor leaving the reactor cyclone separators with heavy hydrocarbon oil in baffle or bubble towers to recover the catalyst fines in a slurry, the disposal of which is troublesome and expensive. The effluent from the catalyst regenerator cyclone separators is usually passed to an electrical precipitator or other secondary separating device which represents a considerable capital investment and a constant operating expense.

U.S. Pat. No. 2,472,777, issued June 7, 1949 for "Triple Tube Cyclone Separator," inventor David H. Putney, discloses a separator of the cyclone type employing an outer shell and two inner concentric tubes, the inner tube open ended at top and bottom, the outer shell and intermediate tube or vessel closed at the top and having constricted openings at their bottoms, an inlet for introducing the gaseous material tangentially near the top of the intermediate tube and a discharge for gases at the top of the inner tube and for solids at the bottom of the outer shell.

BRIEF SUMMARY OF THE INVENTION

The instant invention is directed to a method and apparatus for separating finely divided solid particles or dust from gaseous material such as gas or vapor, broadly conceived. Specifically, this invention is an improvement over my U.S. Pat. No. 2,472,777, supra. Further, it is a device which will take the place of multistage cyclone dust separators where two or more stages of conventional separators are involved.

Thus, in the art of hydrocarbon catalytic cracking, the exit gases from the regenerator contain catalyst particles of many sizes, e.g., 40 microns or less 80 percent, 20 microns or smaller 10 percent to 20 percent and 10 microns or less 5 percent to 10 percent by weight.

In catalytic cracking regenerators, smelting operations, etc. there is usually not enough vapor space in the top of the vessel to accomodate two or three separate stages of fine solid-particle separation. The result is that external separators must be used, with the necessary duct work, butterfly valves, etc. The instant development greatly simplifies this problem and even improves the efficiency of a gas-dust separator where multiple stages cannot be justified.

An object of the instant invention is to provide, in a single vessel or shell, a classifying solids-gas separator, which will deliver in separated form, solids of different particle size without the use of multiple separators and the associated apparatus and attendant duct work.

Another object of the invention is to provide in a single shell or vessel a multi-stage gas-solid separator which can be installed in the vapor space of a catalytic cracking reactor, regenerator, a smelter of such materials as aluminum or the like, coking units, carbon black units or the like to effectively function in the limited zone in which it is installed.

Another object of the invention is to provide within a single unit (e.g. the catalyst regenerator of a hydrocarbon cracking unit employing a solid catalyst) a means of separating the catalyst contained in the exit gases into two or more streams of different particle sizes, one or more of which can be returned to the reactor system and one or more of which can be discarded either to the air or to other recovery apparatus, e.g. to a water spray dryer or a water rotating disc absorber, such as a flash evaporator, to be recovered in slurry form for other use, for example, pressing into solid construction blocks.

Another object of the invention is to provide methods and apparatus employing the centrifugal principles of the cyclone type separator which have improved efficiency as compared to all presently known cyclone type designs, including the triple tube cyclone separator of U.S. Pat. No. 2,472,777.

Another object is to provide a highly efficient classifying separator of simple design and relatively low cost of manufacture.

Other and further objects of the invention will appear in the course of the following description thereof.

In the accompanying drawings, which form a part of the instant specification and are to be read in conjunction therewith, there is shown a classifying separator embodying the invention and, in the various views, like reference numerals indicate like parts.

FIG. 1 is a side, partly sectional elevation of the improved classifying separator particularly illustrating the vertical up and down movement of the particle carrying gases within the device from their input to the ultimate exit therefrom.

FIG. 2 is a vertical plan in partial section of the device of FIG. 1.

FIG. 3 is an enlarged sectional view of the lower portion of the device of FIG. 1.

FIG. 4 is an enlarged detail of one side of the upper end of the device of FIG. 1 illustrating suspension of the concentric tubes with respect to one another.

FIG. 5 is an enlarged detail showing the character of the slots in the concentric tubes of the device of FIGS. 1–4, inclusive.

FIG. 6 is a fragmentary horizontal section thru a device as in FIGS. 1–5, inclusive showing means for closing of one set of slots in one of the tubes or sheets of the device.

FIG. 7 is a graphical representation of particle size distributions for the two classified portions of particles removed from polluted gases run thru the subject device in a first test run.

FIG. 8 is the same as FIG. 7 for a second test run.

DESCRIPTION OF THE DRAWINGS

Turning to the drawings and most particularly FIGS. 1 and 2, at 10 is shown the upper cylindrical portion of a vertical outer vessel shell which, in the lower end thereof has an inwardly tapered frusto-conical portion 10a. A concentric flange 11 is welded or otherwise fixedly attached to the upper peripheral edge of shell portion 10, serving to receive bolts 12 which removably secure top 13 thereto. Top 13 has a central circular opening 13a therethrough. As detailed in FIG. 3, the lower end of the frusto-conical outer shell portion 10a has a circumferential flange 14 welded or otherwise fixedly attached thereto. Flange 14 receives bolts 15 therethrough, removably securing same to a like flange 16 which is welded or otherwise fixedly attached to a cylindrical pipe or tube segment 17. Pipe 17 has a circumferential flange 18 welded or otherwise secured to the lower edge thereof to receive bolts 19 therethrough. The latter removably fix closure plate 20 to the bottom end of pipe section 17 and flange 18. Pipe section 17 has an opening 17a through one side thereof.

Concentrically received and positioned inside of cylindrical portion 10 of the outer shell and extending substantially the length thereof is first sleeve 21 having an upper portion 21a and a lower portion 21b. Suitable hangers 22 removably mount sleeve 21 with its upper end portion 21a in air sealing abutment against the underside of top plate 13. A plurality of sets of elongate slots generally designated 23 are provided spaced around the periphery of sleeve 21. A detail of one of said slots (enlarged) is seen in FIG. 5 and the vertical arrangement of the members of one set of such is seen centrally of FIG. 1 of another sleeve. The number of sets of such slots may be two, three, four or more, a set of four equally spaced sets being illustrated in FIG. 2.

Figure 1:
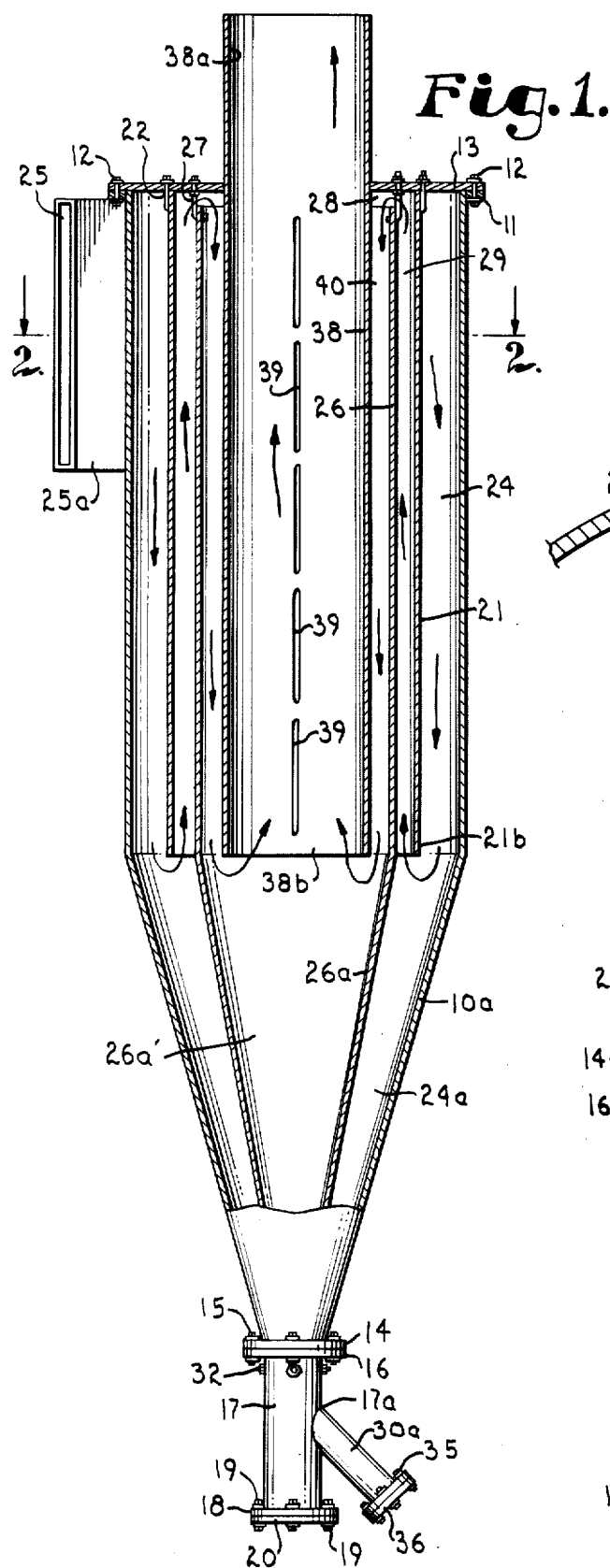

The outer shell portion 10 and first sleeve 21 define therebetween a first, circular outer annulus 24.

A tangential inlet 25 is provided to flow, under pressure, gas containing entrained particles at high velocity into the annulus 24. This inlet is preferably positioned at the uppermost portion of outer shell wall 10, penetrating same through an opening 26 therethrough. The tangential inlet passage is defined by an elongate wall enclosure 25a.

Figure 3:
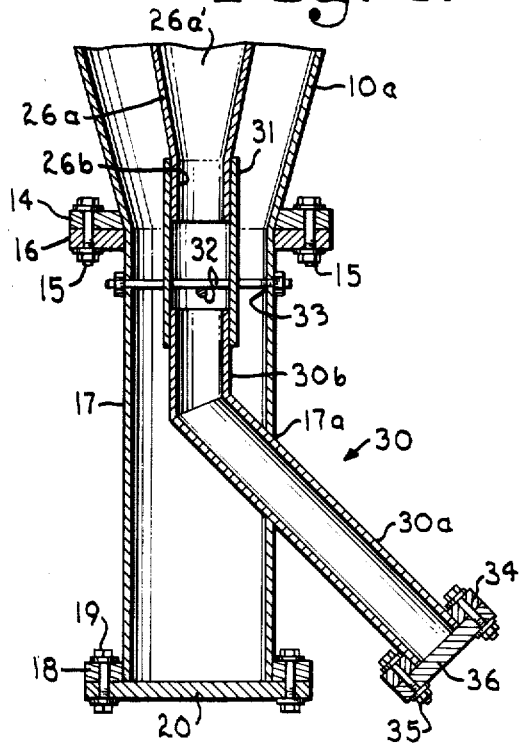

Positioned concentrically inboard of first sleeve 21 is a second, vertical, inner vessel shell having an upper cylindrical portion 26 and a lower frusto-conical portion 26a, the latter having a cylindrical fitting extension 26b at the lower end thereof (FIG. 3). Suitable conventional hangers 27 suspend the cylindrical inner vessel shell 26 spaced downwardly from the underside of top closure 13 whereby to provide a circumferential gap 28 thereabove. A second circular continuous annulus 29 is defined between first sleeve 21 and the outboard surface of the cylindrical portion of shell 26 save in the zone of gap 28.

Fine particle discharge tube 30 has lower portion thereof 30a received through opening 17a in tube or cylinder 17. The upper normally vertical portion 30b is frictionally and sealingly fitted at its upper end within sleeve 31 which also frictionally and air sealingly removably fits over cylindrical portion 26b of inner shell 26. Elongate rods 32 received in openings 33 in the wall of cylinder 17 removably support sleeve 31 in the lower portion 10a of outer shell 10 and cylinder 17. At the lower end of particle outlet tube 30 there is fixedly attached flange 34 which receives bolts 35 removably securing closure 36 to the lower outer end of member 30.

Optionally, additional sets of slots (37) may be provided in shell portion 26 if it is desired to increase the proportion of particles collected in the outer lower annulus 24a, the larger size particle collection zone.

Figure 5:
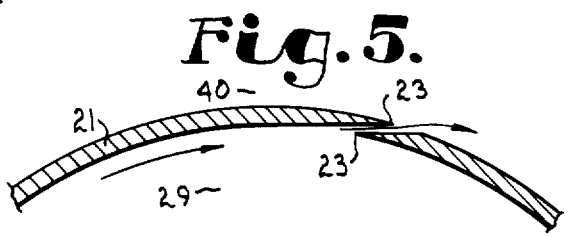

Concentrically positioned inside of the inner shell, cylindrical portion 26 thereof, is an elongate cylindrical discharge tube 38 having an upper portion 38a extending through opening 13a in top closure 13 and a lower end 38b which preferably extends downwardly substantially the length of sleeve 21 and the cylindrical portion 26 of the inner shell. A plurality of sets of slots 39 (here illustrated as four sets 90° displaced from one another) are provided within the portion of tube or sleeve 38 below top closure 13. These slots are the same character as those (23) in first sleeve 21 (FIG. 5), as well as the same character as the optional slots 37 in the cylindrical portion 26 of the inner shell.

OPERATION

In broad outline of operation, gas with entrained particulate material is flowed at high velocity into the tangential inlet passage 25 through housing 25a. This gas moves (FIG. 2) in a clockwise direction at high velocity and, as well, downwardly. As may be seen from FIGS. 1 and 3, the annulus 24 is a closed volume save for access upwardly into the annulus 29 between first sleeve 21 and inner shell portion 26. Air or gas, then, still containing particulate material and still rotating at high speed in a clockwise direction moves upwardly into annulus 29.

Gas with particulate matter not yet fallen out thereof passes over the top of cylindrical portion 26 of inner shell directly under top closure 13 and downwardly into the annulus 40 between inner shell portion 26 and inner sleeve 38. The clockwise rotating gas in annulus 29, together with some particulate matter, as will be described in more detail, passes in some portion out through the slots 23, thus returning gas through said slots into the annulus 24. Particulate matter falling out of the gas rotating in annulus 24 and that gas rotating in annulus 29, as well as in gas returning to the slots into the outer annulus 24 falls down into the lower annulus 24a between the inner and outer shell portions 10a and 26a for capture in and ultimate removal from cylinder 17. This collection zone tends to capture larger diameter, heavier particles for separating removal from the system.

The gas (containing whatever particulate matter has not fallen out into lower annulus 24a through whatever action) moves downwardly in annulus 40 still rotating in clockwise direction (FIG. 2 - view from above) and passes down into the free zone 26a' enclosed by the frusto-conical portion 26a of inner shell 26. The air then rises upwardly into inner sleeve 38 and passes out through top 13. The air inside sleeve 38 continues to rotate in clockwise direction and some of this air, carrying particulate matter passes outboard of sleeve 38 through slots 39. Particulate matter from the air in annulus 40 and inside of tube or sleeve 38 falls out downwardly into frusto-conical zone 26a' and is received within the lower particle receiving member 30 to be removed therefrom. This collection zone tends to capture relatively smaller diameter, lighter particles for separate removal from the system.

Figure 2:
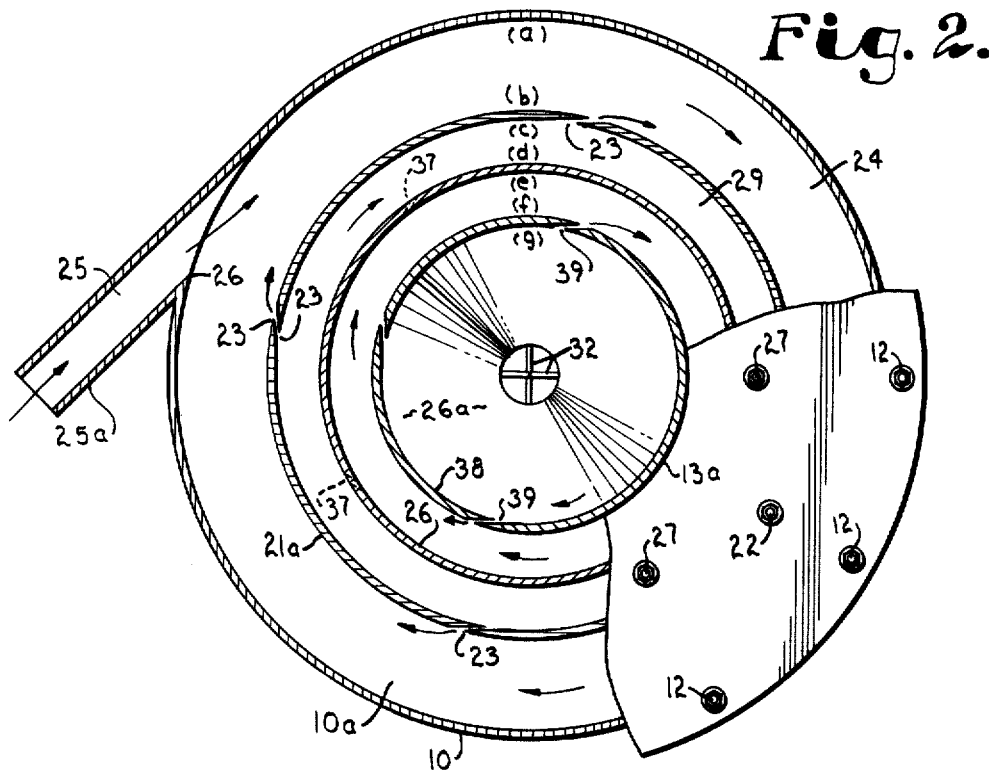

In order to clearly desigate the mechanism of action in the classifying separator, zones (a)-(g) have been designated in FIG. 2 as follows. Zones (a) and (b) are the outboard and inboard portions of annulus 24. Zones (c) and (d) are the outboard and inboard portions of annulus 29, respectively. Zones (e) and (f) are the outboard and inboard portions of annulus 40, respectively. Finally, zone (g) is the outboard portion of the zone or space inside of tube 38.

In accordance with the laws of centrifugal force, then, the pressure prevailing at the various points or zones indicated are as follows:

1. the pressure at (a) is greater than the pressure at (b);
2. the pressure at (c) is greater than the pressure at (b);
3. the pressure at (c) is greater than the pressure at (d);
4. the pressure at (e) is greater than the pressure at (d);
5. the pressure at (e) is greater than the pressure at (f);
6. the pressure at (g) is greater than the pressure at (f).

Further, it has been empirically demonstrated, in a transparent model of the instant device constructed according to the configuration of the drawings (of acrylic plastic), where black threads have been attached in the slots (23 and 39) in the respective tubes 21 and 38 that there is a rather high velocity flow from the inner spaces or annuli to the outer spaces into which the slots communicate. Thus, specifically, the threads, under operation of the device, are violently streamed from inside to outside of the slotted tube in the direction of the tangential flow.

The slot areas or widths should be large enough to pass all or nearly all of the solids sweeping around (under the action of centrifugal force) in contact with the inside of the slotted tube (21 or 38) plus some carrying gas. However, the slots should not be so large as to permit excessive gas flow which tends to reduce the separating efficiency of the unit. For example, in most cases, it is not necessary in any slotted tube (such as 21 or 38) to make the total slot area of that tube (for example, the four sets illustrated) greater than that required to permit the flow of gas from the inner to the outer side of the sleeve or tube greater than 5 percent of the volume of the feed gas. However, ranges from almost zero to 20 percent of the feed gas are feasible, depending upon the gas and particulate matter carried therewith (particularly particle size), as well as the relative degree of pollution (quantity of particulate matter) of the gas stream being cleaned.

It is also possible to vary the distribution of particle sized in the coarse and fine streams of separated solids by variation of the structure. As previously described, slots 23 and 39 are provided (sets of same) in sleeves 21 and 38. This configuration provides a separation into coarse and fine streams of solids segregated in the tube portions 17 (coarse) and 30a (fine).

On the other hand, if it is desired to employ a recovery process with a greater degree of separation of the solids into the coarse or larger particle diameter stream with a segregation of still finer particles into the fine solid stream, then sets of slots are provided in the wall of the inner vessel 26 in the cylindrical portion thereof. This will cause an additional quantity of the relatively heavier or larger diameter solids particles, which would otherwise have been included in the fine particle stream, to flow into and be included in the coarse solids stream.

Figure 6:
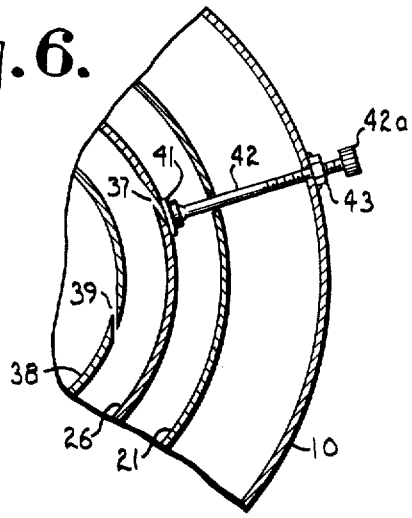
Figure 4:
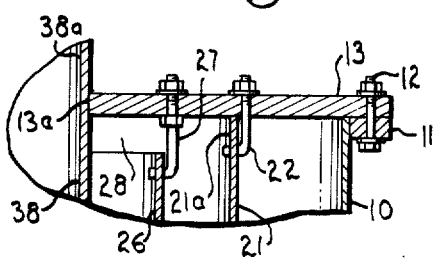

Mechanical means can be provided for changing the slot area of any slotted tube, for example, in inner shell portion 26 by providing, for the slots 37 therein, cover plated operated externally without dismantling the apparatus. FIG. 6 shows one such configuration where arcuate streamlined plates 41 wide enough and long enough to cover the set of slots may be moved radially inwardly or outwardly by meand of elongate screws 42 passing through openings provided in sleeve 21 and outer shell portion 10. Such elongate screw rods are each received in internally threaded members or nuts 43 having adjustment heads on said screw 42a on the outboard portions of screws or bolts 42.

SPECIFIC EXAMPLE

Two runs made on the improved cyclone classifying separator which is the subject of the instant specification were made, using fresh catalytic cracking catalyst. The grain size distribution for the samples for the first run and the second run are given by the following table.

TABLE I

| GRAIN SIZE | | | |
|---|---|---|---|
| 1st RUN ORIGINAL SAMPLE | | 2nd RUN ORIGINAL SAMPLE | |
| Micron Size | % Finer | Micron Size | % Finer |
| 90 | 89.0 | 64 | 91.8 |
| 65 | 80.5 | 46 | 78.0 |
| 46 | 67.8 | 34 | 45.9 |
| 34 | 38.1 | 22 | 13.8 |
| 25 | 8.5 | 13 | 11.5 |
| 13 | 4.2 | 9 | 9.2 |
| 9 | 0.4 | 6 | 4.6 |
| | | 3 | 0.4 |

Figure 7:
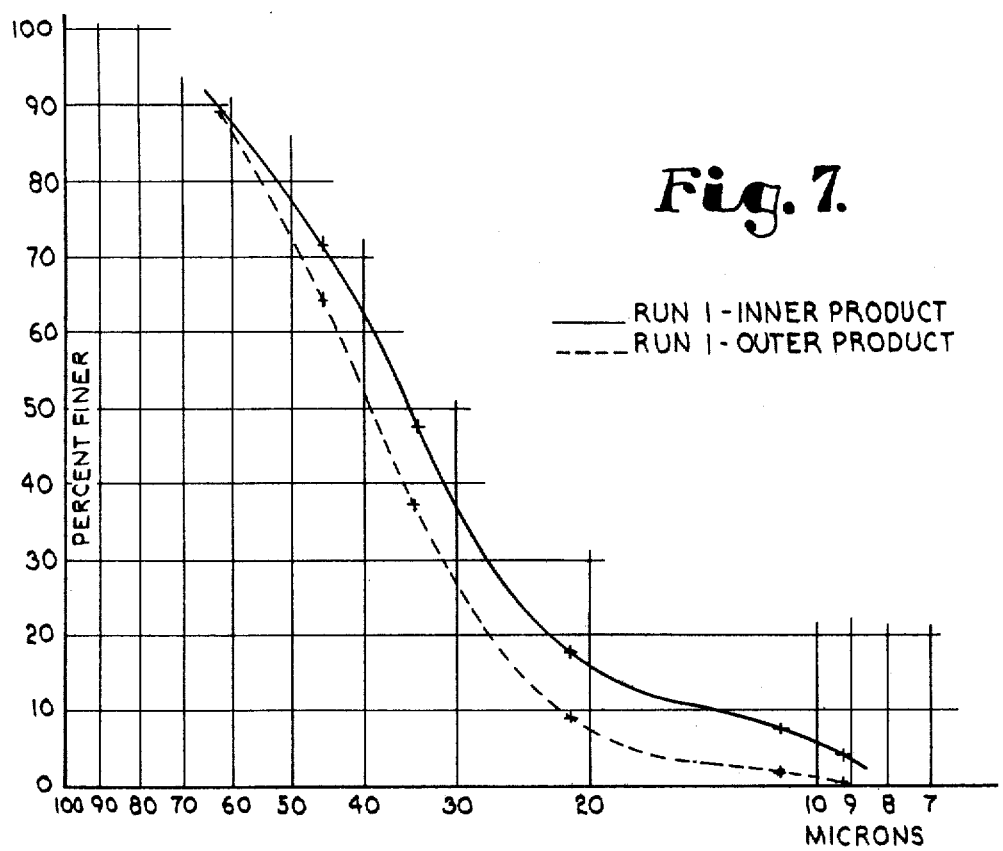
Figure 8:
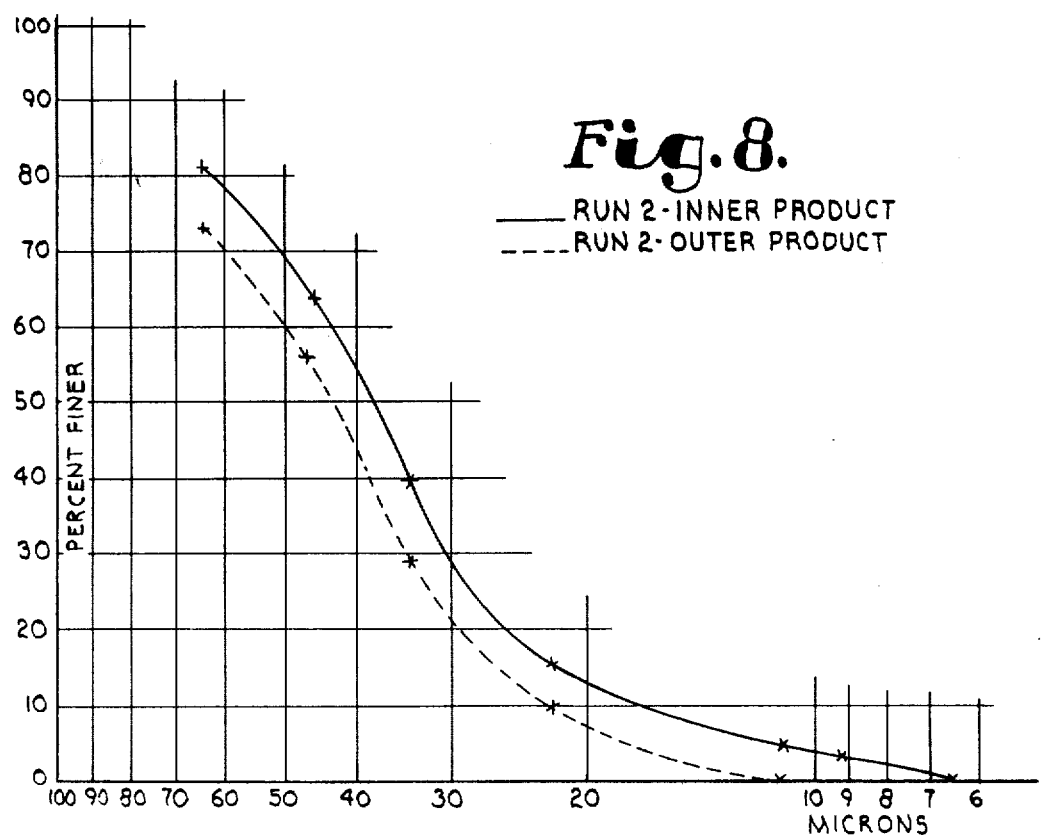

FIG. 7 and FIG. 8 represent grain size analyses, by the hydrometer method, of the first run and second run (respectively) of the samples defined as to size characteristics in Table I. Table II contains the operating information from the two runs.

The quantity distribution of collected solids indicates that the major quantity of solids was separated in the outer section of the classifying cyclone separator, with a relatively minor amount going through to the inner section and only a small percentage going on through the cyclone to be collected in the exit bag.

Table II indicates, among other things, the percentage of total feed collected at each point:

TABLE II

| Run No. | 1 | 2 |
|---|---|---|
| Feed Material | Fresh Catalyst | Fresh Catalyst |
| Run Time | 5:21 | 5:45 |
| Manometer Reading, " H20 | | |
| Start | 5-⅛ | 5-⅛ |
| End | 5-⅛ | 5-⅛ |

TABLE II — Continued

| Run No. | 1 | | 2 | |
|---|---|---|---|---|
| Air Flow, CFM | 490 | | 490 | |
| Solids Feed Rate | | | | |
| Grams/Min. | 263 | | 257 | |
| Grains/Cu. Ft. Air | 8.3 | | 8.1 | |
| Product Quantities, gms, Wt. % | | | | |
| Outer Cone | 1125 | 80.9% | 1135 | 80.8% |
| Inner Cone | 227 | 16.1% | 227 | 16.3% |
| Bag | 41.6 | 3.0% | 39.9 | 2.9% |
| | 1404 | 100.0% | 1392 | 100.0% |

From the small amount of material that reached the bag, it is clear that an extremely effective separation (97% or better) was achieved.

As may be clearly seen from FIGS. 7 and 8, the size distribution of the outer and inner products was fairly similar. However, a slight, but definite classification was obtained. Thus, in both cases, the outer product contained a higher percentage of larger particles than the inner product.

As may be seen from Table II, the two runs were made at essentially duplicate condition with respect to run time, air flow rates and solids feed rates.

Table III provides the detailed grain size distributions for the inner and outer product for both runs:

TABLE III

| RUN 1 Micron Size | INNER PRODUCT % Finer | RUN 1 Micron Size | OUTER PRODUCT % Finer |
|---|---|---|---|
| 62 | 89.6 | 63 | 90.1 |
| 45 | 72.0 | 46 | 65.5 |
| 33 | 46.7 | 34 | 36.9 |
| 22 | 17.5 | 22 | 8.8 |
| 13 | 7.8 | 13 | 2.0 |
| 9 | 3.9 | 9 | 0.4 |

| RUN 2 Micron Size | INNER PRODUCT % Finer | RUN 2 Micron Size | OUTER PRODUCT % Finer |
|---|---|---|---|
| 63 | 80.5 | 65 | 73.1 |
| 46 | 65.2 | 47 | 56.8 |
| 34 | 39.3 | 34 | 28.4 |
| 22 | 15.3 | 22 | 4.0 |
| 13 | 7.7 | 13 | 0.4 |
| 9 | 3.8 | | |
| 6 | 0.4 | | |

It should be noted that the outer annulus 24 is provided of greater volume (the combination of both greater width and circumference) than annuli 29 and 40. This provides a considerably lower velocity of rotation of the fluids in zone 24 which tends to separate the coarser (heavier) particles, leaving the finer particles to be separated in the zones of higher tangential velocity.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A classifying separator for removing entrained particles from gaseous materials comprising:

a vertical outer vessel shell having an upper cylindrical portion and closed at the top thereof and tapered downwardly at the bottom thereof to form a first restricted bottom discharge opening for the removal of solids;

a first cylindrical sleeve concentrically positioned within the first vessel and spaced inwardly thereof with its upper end fixed in an air sealing relation to the top of the first vessel and its lower end free therewithin, whereby to provide a first circular annulus between the shell and first sleeve open at its lower end;

a vertical inner vessel shell having an upper cylindrical portion concentrically positioned within said first sleeve and spaced inwardly thereof, said inner shell tapered downwardly at the bottom thereof to form a restricted air sealed bottom discharge for said inner vessel;

the inner vessel shell spaced downwardly from the top of the outer shell to provide a continuous, circumferential gap thereover for passage inwards thereof of gas and gas entrained solids;

the inner shell and first sleeve providing therebetween a second circular annulus open at its lower end;

a second cylindrical sleeve concentrically positioned within the second shell and spaced inwardly therefrom and above the tapered portion of said inner vessel whereby to provide a third circular annulus between said inner vessel shell and second sleeve open at its lower end;

the upper end of said second sleeve penetrating the outer vessel shell top closure to provide a gas discharge outlet;

an inlet connected tangentially into the upper portion of said outer vessel shell for introducing gases and entrained solids to the first annulus, and substantially vertically oriented slotted passageways in the walls of the first and second sleeves for removing solids from the gaseous materials passing through the second annulus and inner sleeve, respectively.

2. A classifying separator as in claim 1 including substantially vertically oriented slotted passageways in the walls of the inner vessel shell for removing solids from the gaseous materials passing through the third annulus.

3. A classifying separator as in claim 1 wherein the length of the upper cylindrical portions of said outer and inner shells are substantially equal to the length of said first and second sleeves, with the outer and inner shells therebelow tapering inwardly downwardly in frusto-conical shape.

4. A classifying separator as in claim 1 wherein there are four vertically oriented sets of passageways in each of the first and second sleeves, each set substantially 90° displaced from the others in each said sleeve.

* * * * *